(12) United States Patent
Banks

(10) Patent No.: US 11,542,995 B2
(45) Date of Patent: Jan. 3, 2023

(54) DRUM BRAKE SPIDER OPTIMIZED FOR VIBRATION AND APPLICATION

(71) Applicant: Bendix Commercial Vehicle Systems LLC, Elyria, OH (US)

(72) Inventor: Daniel E. Banks, Climax, MI (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 168 days.

(21) Appl. No.: 17/155,148

(22) Filed: Jan. 22, 2021

(65) Prior Publication Data
US 2022/0235833 A1    Jul. 28, 2022

(51) Int. Cl.
*F16D 65/09* (2006.01)
*F16D 65/00* (2006.01)
*F16D 51/00* (2006.01)

(52) U.S. Cl.
CPC ......... *F16D 65/0006* (2013.01); *F16D 65/09* (2013.01); *F16D 2051/003* (2013.01); *F16D 2200/0082* (2013.01); *F16D 2250/0007* (2013.01); *F16D 2250/0023* (2013.01)

(58) Field of Classification Search
CPC ...... F16D 65/0006; F16D 65/09; F16D 65/08; F16D 51/00; F16D 2051/003; F16D 2200/0082; F16D 2250/007; F16D 2250/0023
See application file for complete search history.

(56) References Cited

U.S. PATENT DOCUMENTS

| | | | | |
|---|---|---|---|---|
| 5,325,945 | A | * 7/1994 | Walker | F16D 51/00 |
| | | | | 188/341 |
| 7,708,124 | B1 | 5/2010 | Rackers et al. | |
| 8,387,926 | B2 | 3/2013 | Runels et al. | |
| 9,033,119 | B2 | 5/2015 | Flodin et al. | |
| 9,062,728 | B2 | * 6/2015 | Plantan | F16D 65/08 |
| 9,133,898 | B2 | * 9/2015 | Banks | F16D 51/20 |
| 9,303,703 | B2 | * 4/2016 | Banks | F16D 65/60 |
| 9,574,626 | B1 | * 2/2017 | Berwanger | F16D 65/60 |
| 10,088,000 | B2 | * 10/2018 | Berwanger | F16D 51/28 |
| 10,330,160 | B2 | 6/2019 | Goodell | |
| 2010/0193303 | A1 | 8/2010 | Li et al. | |
| 2012/0247885 | A1 | 10/2012 | Lantz et al. | |
| 2014/0353101 | A1 | * 12/2014 | Plantan | F16D 65/09 |
| | | | | 188/250 F |

(Continued)

FOREIGN PATENT DOCUMENTS

CN         204284262 U     4/2015

*Primary Examiner* — Thomas W Irvin
(74) *Attorney, Agent, or Firm* — Crowell & Moring LLP

(57) ABSTRACT

A one piece drum brake spider construction eliminates welds and distortion, at least relative to a typically fabricated spider, and should improve brake performance. The spider includes a main body plate having opposed flat sides, an outer perimeter, and an inner perimeter configured to receive an axle tube. Vibration control structure is preferably formed on at least one of the opposed flat sides of the main body plate, and the brake drum spider additionally includes weight minimizing features. At least the main body plate may be produced by any of a casting technique, a stamping technique, a machining technique, and an additive manufacturing technique. The invention also concerns a process of producing such a brake drum spider.

24 Claims, 2 Drawing Sheets

(56) References Cited

U.S. PATENT DOCUMENTS

| | | | |
|---|---|---|---|
| 2015/0047931 A1* | 2/2015 | Banks | F16D 51/20 188/206 R |
| 2016/0010709 A1* | 1/2016 | Banks | F16D 65/60 188/234 |
| 2017/0030422 A1* | 2/2017 | Berwanger | F16D 65/60 |
| 2021/0262536 A1* | 8/2021 | Banks | F16D 65/0056 |

* cited by examiner

DRUM BRAKE SPIDER OPTIMIZED FOR VIBRATION AND APPLICATION

BACKGROUND OF THE INVENTION a. Field of the Invention

This invention concerns a simplified brake spider usable in drum brakes that can be produced in a way eliminating welds and distortion, at least relative to a typically fabricated spider.

b. Background Art

U.S. Pat. No. 7,708,124 B1 to Rackers et al. discloses an axle system for securing a plurality of components, including an anchoring sleeve assembly having an annular portion and a plurality of outwardly projecting extended portions. An anchoring sleeve is pre-machined by any of a variety of techniques, and includes strength enhancing structural webs and ribs.

U.S. Pat. No. 9,062,728 B2 to Plantan discloses a particularly configured brake spider for a drum brake, with the spider including a central aperture configured to receive an axle extending through the central aperture.

Chinese Publication CN 204284262 U discloses a light high-intensity braking bottom plate with a plurality of reinforcing ribs arranged so that intensity is enhanced, weight is reduced, casting defects, such as looseness, sinking and hot spots, are overcome, and product quality is enhanced.

Other documents that may be of interest are U.S. Patent Application Publication US 2012/0247885 A1 to Lantz et al., U.S. Pat. No. 8,387,926 B2 to Runels et al., U.S. Pat. No. 9,033,119 B2 to Flodin et al., and U.S. Pat. No. 10,330,160 B2 to Goodell.

BRIEF SUMMARY OF THE INVENTION

The main mounting component for a truck drum brake is a brake spider mounted to the axle flange, with the rest of the brake components being mounted to the spider. A primary function of the spider, therefore, is to support a camshaft bracket and the brake shoes that, together, engage an inside diameter of the drum and create friction that will decelerate and stop the vehicle. Engagement of the brake shoes and the drum can cause extremely high loads throughout the brake, and especially the brake spider. Historically, brake spiders have been manufactured cast iron or stamped steel. Each of these processes has inherent drawbacks for placing material in the most optimized location for each application. This creates inefficiencies and causes extra cost and weight in the spider. The tooling costs for each of these processes can also be extremely high, which may cause more waste when lower volume components are involved, which can often be the case.

A one piece spider construction according to the invention eliminates welds and distortion, at least relative to a typically fabricated spider, and should improve brake performance. The spider can be reinforced with ribbing to stiffen and improve performance, and the reinforcement can be adjusted for higher loaded applications and optimized for lighter duty applications. Variable reinforcement in the cam end of the spider can be engineered to match specific applications of camshaft brackets to support the loads associated with various lengths and angles of brackets, and the size of a pneumatic or other actuator, including extending bracket lengths without an external support. Use of an additive manufacturing technique, in particular, enables implementation of a spider design acting to dampen vibration and control natural frequencies of the overall complete brake assembly based on specific application requirements.

In one preferred configuration, a brake drum spider according to the invention includes a main body plate having opposed flat sides, an outer perimeter, and an inner perimeter configured to receive an axle tube, the main body plate including fixture openings distributed between the outer and inner perimeters suitable for receiving fasteners, which may be utilized to secure the spider to fixed vehicle structure. The spider could also have a section disposed around an opening forming a passage for cam actuator structure, as well as an anchor pin support interconnected with the main body plate. Vibration control structure is preferably formed on at least one of the opposed flat sides of the main body plate, and the brake drum spider additionally includes weight minimizing features. At least the main body plate may be produced by any of a casting technique, a stamping technique, a machining technique, and an additive manufacturing technique. The invention also concerns a process of producing such a brake drum spider.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
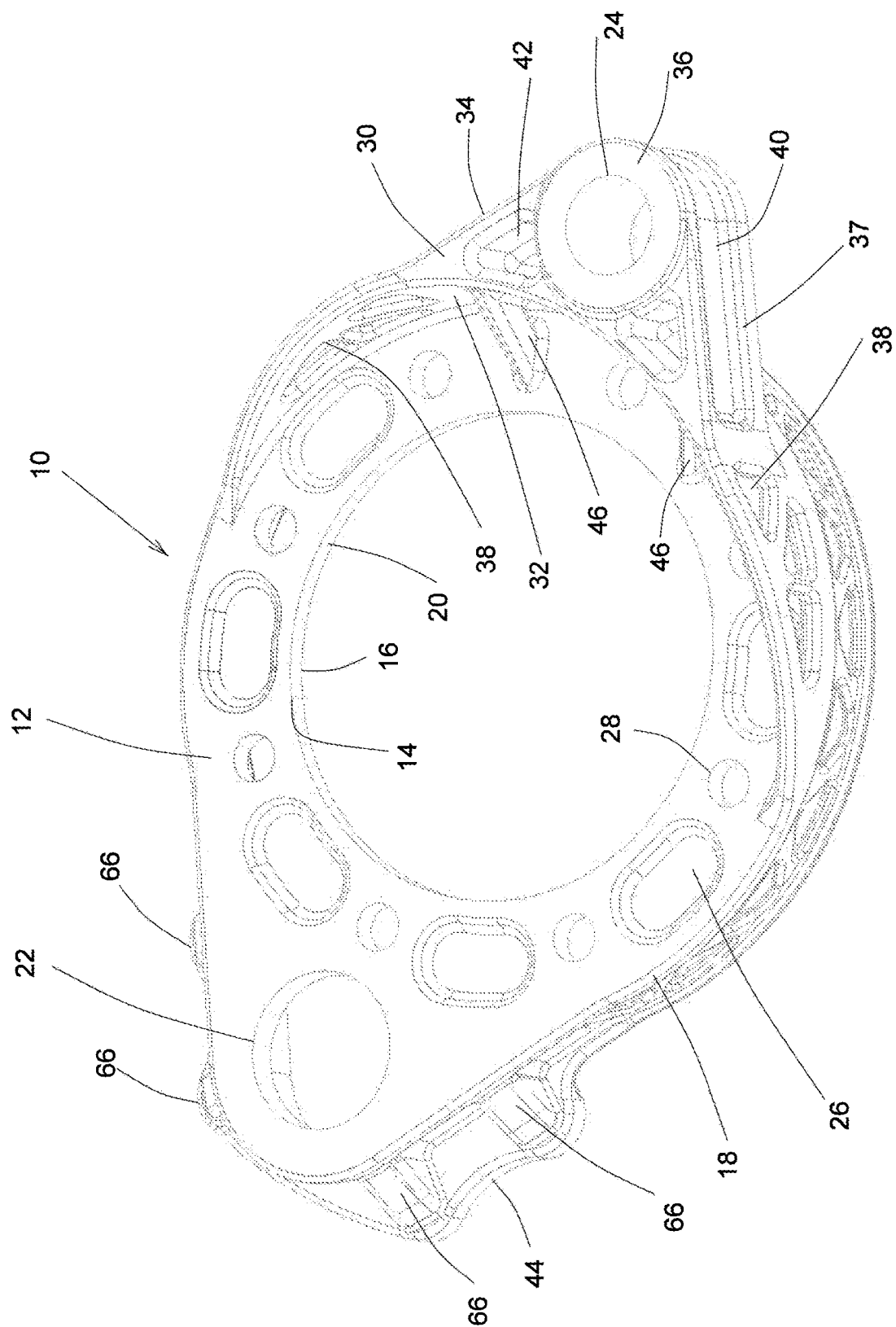
FIG. 1 is a perspective view of one side of an example of a brake drum spider according to the invention.

FIG. 1 illustrates one example of a spider 10, such as a truck drum brake spider, according to the invention. The spider 10 represented has a main body plate 12 with an outer perimeter 18 having a roughly teardrop shape, an inner perimeter 20 having a roughly circular shape, a number of indentations positioned between the perimeters 18 and 20, and openings extending between opposed flat sides 14 and 16 of the main body plate 12. The particular plate openings shown in FIG. 1 include a tube opening 22 in a first plate extension defined by the plate 12 for receiving a cam tube (not shown) extending in what will be identified as the axial direction and forming a passage for cam actuator structure (not shown). An anchor pin opening 24 is provided for receiving a drum brake anchor pin (not shown), as will be described. Weight minimizing and vibration frequency fine tuning features, here in the form of recesses, indentations, or openings 26, and fixture openings 28 suitable for receiving bolts or other fasteners (not shown) to secure the spider 10 to an axle housing or other fixed vehicle structure (not shown), are included as well between the outer and inner perimeters 18 and 20 of the main body plate 12.

Anchor structure 30 is shown as projecting from the side 14 of the plate 12 in FIG. 1. The anchor structure 30 includes a web 32, generally configured as an arc located at or adjacent to the outer body plate perimeter 18, an anchor pin support including a receptacle 36 in which the anchor pin opening 24 is defined, an anchor plate 61, best visible in FIG. 2, securing the receptacle 36 to the web 32, and anchor side walls 37 with strengthening spars 34 interconnecting the receptacle 36 and the web 32 with each other. Openings 38 may be included in the web 32 for weight reduction. Indentations 40, oriented circumferentially relative to the spider 10, may also be provided in the anchor side walls 37 for weight reduction and mass manipulation; as illustrated, these indentations 40 axially separate the spars 34 from the anchor plate 61, while recesses 42, extending both radially and axially relative to the spider 10, may partially separate each spar 34 from the web 32 and assist as well with weight minimization. Every feature of the spider 10, it is to be noted, is available for mass manipulation to control vibration and weight for each application. At least one support rib 46 extending between the body plate flat side 14 and a radially inward facing surface of the web 32 can be supplied to stiffen the web 32 and prevent undesirable web deformation. As illustrated in FIG. 1, two such support ribs 46 extend between the side 14 and the radially inward facing surface of the web 32.

Figure 2:
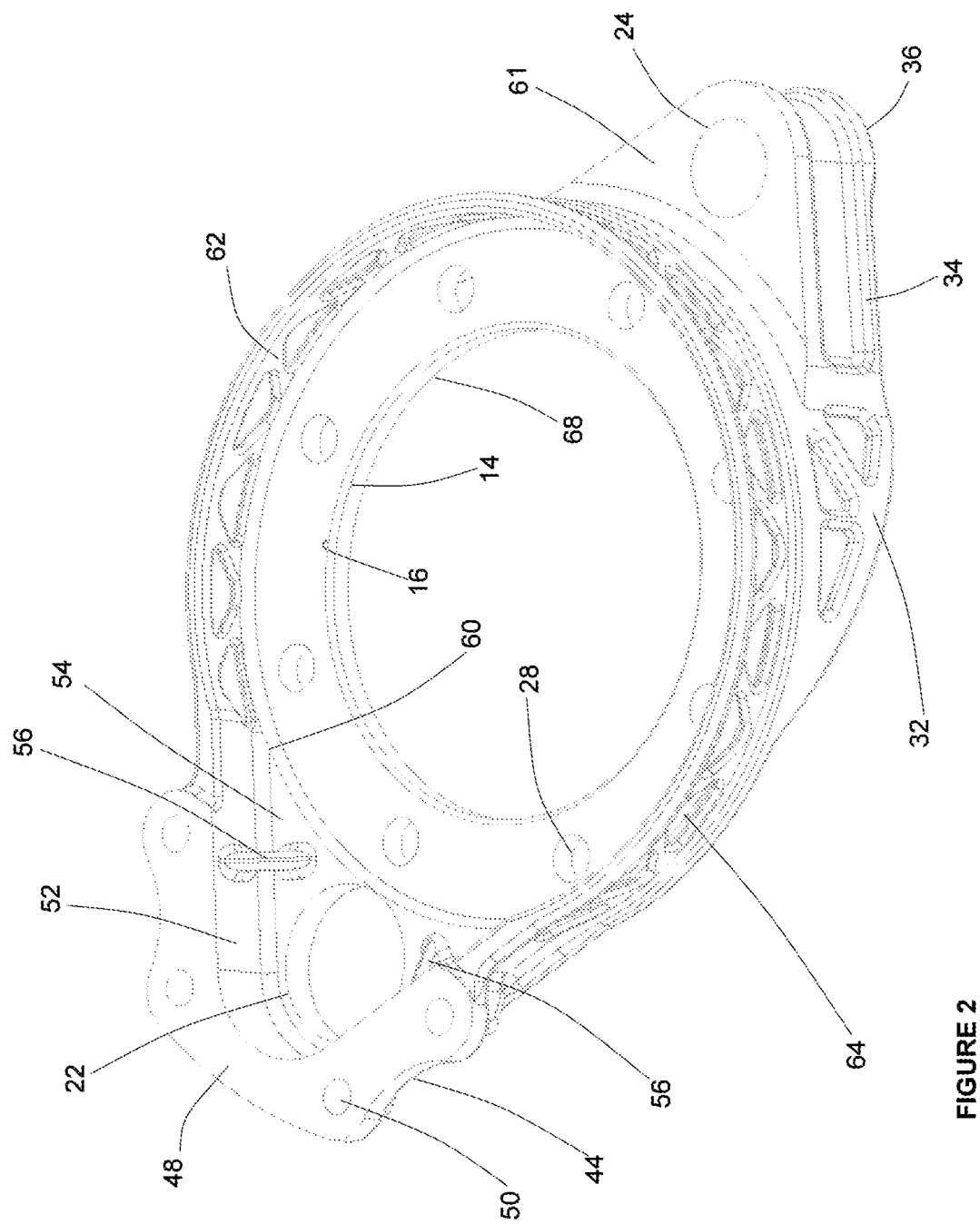
FIG. 2 is a perspective view of the brake drum spider example shown in FIG. 1 but showing an opposite side of the spider.

Cam tube support structure 44 is shown as projecting from the flat side 16 of the plate 12. This cam tube support structure 44 has a lateral side wall 52 (see FIG. 2) projecting in a generally axial direction and a connection flange 48 at an edge of the lateral side wall 52. The side wall 52 and a section 54 (see FIG. 2) of the main body plate 12 disposed around the tube opening 22, together with an enclosure element (not shown) secured to the connection flange 48 by bolts or other fasteners (not shown) extending through fastener holes 50 in the connection flange 48, form part of a housing receiving a cam (not shown) operable in an manner understood by those of ordinary skill in the art to produce brake shoe frictional engagement with and disengagement from a brake drum (not shown). At least one support rib 56 extending between the section 54 of the main body plate 12 and the lateral side wall 52 can be supplied to stiffen the lateral side wall 52 and prevent undesirable wall deformation; as illustrated in FIG. 2, two such support ribs 56 extend between the side wall 52 and the main body plate section 54.

The lateral side wall 52 of the cam tube support structure may extend beyond a junction 60 of the section 54 with the remainder of the main body plate 12. As illustrated, outside of the junction 60, a side wall or side wall extension 62 disposed on the main body plate side 16 extends entirely around the outer perimeter of the side 16. Alternative configurations, in which multiple wall extension sections are spread out individually around the perimeter of the side 16, outside of the junctions 60, are also possible. Extension openings 64 may be distributed about the side wall extension 62 for weight reduction purposes. Also visible in FIG. 2 is an optional reinforcing ridge 68 surrounding the inner perimeter 20 of the spider. It will be understood by those skilled in the art that a ridge 68 could be included on flat side 14 only or on flat side 16 only, or that ridges 68 could be included on both of the flat sides 14 and 16 of the main body plate 12. This portion of the structure could have internal webbing and ribs, tied together with internal lattices.

Referring once again to FIG. 1, two pairs of stiffening ribs 66 are shown as disposed between the connection flange 48 of the cam tube support structure 44 and an outer surface of the lateral side wall 52. These ribs 66 may be included to further stiffen the lateral side wall 52 and prevent undesirable wall deformation. A greater or smaller number of ribs 66 could be utilized, or the ribs 66 could be eliminated altogether if duty applications are light. The web 32 having the openings 38, the support ribs 46 extending between the side 14 and the radially inward facing surface of the web 32, the side wall extension 62 with the extension openings 64, the support ribs 56 extending between the side wall 52 and the main body plate section 54, and the stiffening ribs 66 disposed between the connection flange 48 of the cam tube support structure 44 and an outer surface of the lateral side wall 52 constitute vibration control structure that may be suitably adjusted in production to accommodate the competing requirements for high brake drum spider strength and rigidity and low brake drum spider weight.

Casting, stamping, machining, or a variety of other techniques can be used to produce the spider 10. One manufacturing technique suitable for producing the truck drum brake spider 10, for example, might be an additive manufacturing technique designed for specific applications based on loads, mounting hole patterns, and available envelope. Structural walls and webs could be created with precisely the material required, without regard for traditional manufacturing limitations. Expensive and specific tooling could be eliminated by using such an additive manufacturing technique, and changeover could be accomplished by simply loading a new computer file. Each spider could be designed and built to optimize material usage for strength, weight, and natural frequency to help control noise and vibration.

In its preferred configuration, the brake drum spider 10 is primarily formed by the main body plate 12 having the opposed flat sides 14, 16 and defining the outer and inner perimeters 18 and 20. The inner perimeter 20, again, is configured to define an opening to receive an axle tube. The plate 12 has the fixture openings 28 mentioned, suitable for receiving fasteners to secure the spider to fixed vehicle structure, and the section 54 disposed around the opening 22 forms a passage for cam actuator structure (not shown). In one customized design, the main body plate 12, the anchor plate 61, the lateral side wall extension 62, and other parts of the anchor pin support, including the spars 34, the receptacle 36, the plate 61, and the anchor side walls 37, may all form one unitary piece. In its preferred form, at least the main body plate 12 is produced by any of a casting technique, a stamping technique, a machining technique, and an additive manufacturing technique.

Having a truck drum brake spider designed to take advantage of an additive manufacturing process provides for optimized material use in terms of strength, weight, and natural frequency to help with noise and vibration. Using less material saves cost and weight, while adding strength and controlling natural frequency adds value for customers in terms of increased durability and potentially improved noise characteristics. Dedicated and specific tooling costs are eliminated by using an additive manufacturing process, with machinery required for casting, stamping, machining, or another such manufacturing technique being replaced by a flexible machine that can make a wide variety of parts with minimal changeover. This can lower costs, especially on lower volume components, and could offer the ability to widen product offerings.

While the invention has been shown and described with reference to one or more particular embodiments thereof, it will be understood by those of skill in the art that various changes and modifications can be made without departing from the spirit and scope of the invention.

The invention claimed is:
1. A brake drum spider comprising:
a main body plate having opposed flat sides, an outer perimeter, and an inner perimeter configured to receive an axle tube, the main body plate including fixture openings distributed between the outer and inner perimeters suitable for receiving fasteners to secure the spider to fixed vehicle structure and a section disposed around an opening forming a passage for cam actuator structure, an anchor pin support interconnected with the main body plate, and vibration control structure on at least one of the opposed flat sides of the main body plate, wherein the brake drum spider includes weight minimizing features, the anchor pin support includes a receptacle in which an anchor pin opening is defined, and the anchor pin support further includes an anchor plate between the receptacle and a web located at or adjacent to the outer body plate perimeter, and anchor side walls interconnecting the receptacle and the web with each other.

2. The brake drum spider according to claim 1, wherein the anchor pin support further includes spars for strengthening the anchor side walls.

3. The brake drum spider according to claim 1, wherein at least the main body plate is produced by any of a casting technique, a stamping technique, a machining technique, and an additive manufacturing technique.

4. A bake drum spider comprising:
a main body plate having opposed flat sides, an outer perimeter, and an inner perimeter configured to receive an axle tube, the main body plate including fixture openings distributed between the outer and inner perimeters suitable for receiving fasteners to secure the spider to fixed vehicle structure and a section disposed around an opening forming a passage for cam actuator structure, an anchor pin support interconnected with the main body plate, and vibration control structure on at least one of the opposed flat sides of the main body plate, wherein the brake drum spider includes weight minimizing features, and the vibration control structure includes a web, configured as an arc located at or adjacent to the outer body plate perimeter.

5. The brake drum spider according to claim 4, wherein the vibration control structure includes a support rib extending between one of the flat main body plate flat sides and a radially inward facing surface of the web located at or adjacent to the outer body plate perimeter.

6. The brake drum spider according to claim 4, wherein at least the main body plate is produced by any of a casting technique, a stamping technique, a machining technique, and an additive manufacturing technique.

7. A brake drum spider comprising:
a main body plate having opposed flat sides, an outer perimeter, and an inner perimeter configured to receive an axle tube, the main body plate including fixture openings distributed between the outer and inner perimeters suitable for receiving fasteners to secure the spider to fixed vehicle structure and a section disposed around an opening forming a passage for cam actuator structure, an anchor pin support interconnected with the main body plate, and vibration control structure on at least one of the opposed flat sides of the main body plate, wherein the brake drum spider includes weight minimizing features, and the vibration control structure includes a side wall extension including openings and located around the outer perimeter of the main body plate.

8. The brake drum spider according to claim 7, wherein the vibration control structure further includes a support rib extending between a section of the main body plate disposed around a cam actuator passage and a side wall of on the main body plate.

9. The brake drum spider according to claim 7, wherein at least the main body plate is produced by any of a casting technique, a stamping technique, a machining technique, and an additive manufacturing technique.

10. A brake drum spider comprising:
a main body plate having opposed flat sides, an outer perimeter, and an inner perimeter configured to receive an axle tube, the main body plate including fixture openings distributed between the outer and inner perimeters suitable for receiving fasteners to secure the spider to fixed vehicle structure and a section disposed around an opening forming a passage for cam actuator structure, an anchor pin support interconnected with the main body plate, and vibration control structure on at least one of the opposed flat sides of the main body plate, wherein the brake drum spider includes weight minimizing features, and the vibration control structure includes a support rib extending between a section of the main body plate disposed around a cam actuator passage in the spider.

11. The brake drum spider according to claim 10, wherein at least the main body plate is produced by any of a casting technique, a stamping technique, a machining technique, and an additive manufacturing technique.

12. A process of producing a brake drum spider comprising:
generating a main body plate having opposed flat sides, an outer perimeter, and an inner perimeter configured to receive an axle tube by any of a casting technique, a stamping technique, a machining technique, and an additive manufacturing technique so as to include, in the main body plate, fixture openings distributed between the outer and inner perimeters suitable for receiving fasteners to secure the spider to fixed vehicle structure and a section disposed around an opening forming a passage for cam actuator structure, adding an anchor pin support to the main body plate, and adding vibration control structure on at least one of the opposed flat sides of the main body plate, wherein the anchor pin support is generated with a receptacle in which an anchor pin opening is defined, and adding the anchor pin support includes generating an anchor plate between the receptacle and a web located at or adjacent to the outer body plate perimeter, and anchor side walls interconnecting the receptacle and the web with each other.

13. The process according to claim 12, wherein generating the anchor pin support further includes generating spars for strengthening the anchor side walls.

14. The process according to claim 12, wherein the main body plate is produced by said additive manufacturing technique.

15. A process of producing a brake drum spider comprising:
generating a main body plate having opposed flat sides, an outer perimeter, and an inner perimeter configured to receive an axle tube by any of a casting technique, a stamping technique, a machining technique, and an additive manufacturing technique so as to include, in the main body plate, fixture openings distributed between the outer and inner perimeters suitable for receiving fasteners to secure the spider to fixed vehicle structure and a section disposed around an opening forming a passage for cam actuator structure, adding an anchor pin support to the main body plate, and adding vibration control structure on at least one of the opposed flat sides of the main body plate, wherein adding the vibration control structure includes generating, by way of any of the casting, stamping, machining, and additive manufacturing techniques, a web, configured as an arc located at or adjacent to the outer body plate perimeter.

16. The process according to claim 15, wherein adding the vibration control structure further includes generating a support rib extending between one of the flat main body plate flat sides and a radially inward facing surface of the web located at or adjacent to the outer body plate perimeter.

17. The process according to claim 16, wherein generating the support rib is performed by any of a casting technique, a stamping technique, a machining technique, and an additive manufacturing technique.

18. The process according to claim 15, wherein adding the vibration control structure includes generating a side wall extension including openings located around the outer perimeter of the main body plate.

19. The process according to claim 18, wherein generating the side wall extension is performed by any of a casting technique, a stamping technique, a machining technique, and an additive manufacturing technique.

20. The process according to claim 15, wherein the main body plate is produced by said additive manufacturing technique.

21. A process of producing a brake drum spider comprising:

generating a main body plate having opposed flat sides, an outer perimeter, and an inner perimeter configured to receive an axle tube by any of a casting technique, a stamping technique, a machining technique, and an additive manufacturing technique so as to include, in the main body plate, fixture openings distributed between the outer and inner perimeters suitable for receiving fasteners to secure the spider to fixed vehicle structure and a section disposed around an opening forming a passage for cam actuator structure, adding an anchor pin support to the main body plate, and adding vibration control structure on at least one of the opposed flat sides of the main body plate, wherein adding the vibration control structure includes generating a support rib extending between a section of the main body plate disposed around a cam actuator passage and a side wall of on the main body plate.

22. The process according to claim 21, wherein the main body plate is produced by said additive manufacturing technique.

23. A process of producing a brake drum spider comprising:

generating a main body plate having opposed flat sides, an outer perimeter, and an inner perimeter configured to receive an axle tube by any of a casting technique, a stamping technique, a machining technique, and an additive manufacturing technique so as to include, in the main body plate, fixture openings distributed between the outer and inner perimeters suitable for receiving fasteners to secure the spider to fixed vehicle structure and a section disposed around an opening forming a passage for cam actuator structure, adding an anchor pin support to the main body plate, and adding vibration control structure on at least one of the opposed flat sides of the main body plate, wherein adding the vibration control structure further includes generating an additional support rib extending between a section of the main body plate disposed around a cam actuator passage and a side wall of on the main body plate.

24. The process according to claim 23, wherein the main body plate is produced by said additive manufacturing technique.

* * * * *